United States Patent
Sawai et al.

(10) Patent No.: US 11,635,168 B2
(45) Date of Patent: Apr. 25, 2023

(54) HIGH-PRESSURE TANK

(71) Applicant: TOYOTA JIDOSHA KABUSHIKI KAISHA, Toyota (JP)

(72) Inventors: Osamu Sawai, Okazaki (JP); Yuki Kai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/649,621

(22) Filed: Feb. 1, 2022

(65) Prior Publication Data

US 2022/0260206 A1 Aug. 18, 2022

(30) Foreign Application Priority Data

Feb. 15, 2021 (JP) .............................. JP2021-022155

(51) Int. Cl.
 *F17C 1/04* (2006.01)
 *F17C 13/04* (2006.01)

(52) U.S. Cl.
 CPC ............... *F17C 1/04* (2013.01); *F17C 13/04* (2013.01); *F17C 2203/011* (2013.01); *F17C 2203/0604* (2013.01); *F17C 2205/0305* (2013.01)

(58) Field of Classification Search
 CPC ...... F17C 1/04; F17C 13/04; F17C 2203/011; F17C 2203/0604; F17C 2205/0305; F17C 13/06; F17C 2205/0308; F17C 2205/0311; F17C 2205/0332; F17C 2205/0335
 USPC ....................................................... 220/586
 See application file for complete search history.

(56) References Cited

U.S. PATENT DOCUMENTS

| | | | |
|---|---|---|---|
| 2014/0103051 A1* | 4/2014 | Kanezaki | F17C 13/002 220/587 |
| 2016/0025266 A1* | 1/2016 | Leavitt | F17C 1/16 206/0.6 |
| 2018/0163927 A1* | 6/2018 | Kanezaki | F17C 13/002 |
| 2018/0266632 A1* | 9/2018 | Ogiwara | F17C 1/06 |
| 2019/0248229 A1* | 8/2019 | Pelger | F17C 13/12 |
| 2020/0217457 A1* | 7/2020 | Sawai | F17C 13/06 |
| 2020/0240587 A1* | 7/2020 | Ogiwara | H01M 8/04776 |
| 2020/0408360 A1* | 12/2020 | Kawase | F17C 1/06 |

(Continued)

FOREIGN PATENT DOCUMENTS

| | | | |
|---|---|---|---|
| JP | 2016183687 A | * | 10/2016 |
| JP | 2017145920 A | | 8/2017 |
| JP | 2020112189 A | | 7/2020 |

(Continued)

*Primary Examiner* — John K Fristoe, Jr.
*Assistant Examiner* — Laura E. Parker
(74) *Attorney, Agent, or Firm* — Dickinson Wright, PLLC (57) ABSTRACT

A high-pressure tank for storing a gas includes: a liner having a cylindrical opening; a reinforcing layer covering the liner; a mouthpiece including an external thread portion on an outer periphery thereof and externally fixed to the reinforcing layer covering the opening; a manifold including an inserted portion to be inserted into the opening so as to close the opening, an abutting surface configured to abut on an end face of the opening, and an internal thread portion on an inner periphery thereof to be screwed into the external thread portion of the mouthpiece; and a communicating path that allows the abutting surface of the manifold to communicate with an outside of the high-pressure tank.

1 Claim, 8 Drawing Sheets

(56) References Cited

U.S. PATENT DOCUMENTS

2021/0348724 A1* 11/2021 Wada ........................ F17C 1/00

FOREIGN PATENT DOCUMENTS

| WO | WO-2010058452 A1 * | 5/2010 | ................ F17C 1/06 |
| WO | WO-2020264585 A1 * | 12/2020 | ................ F16J 12/00 |

* cited by examiner

HIGH-PRESSURE TANK

CROSS REFERENCE TO RELATED APPLICATIONS

The present application claims priority from Japanese patent application JP 2021-022155 filed on Feb. 15, 2021, the entire content of which is hereby incorporated by reference into this application.

BACKGROUND

Technical Field

The present disclosure relates to a high-pressure tank for storing a gas.

Background Art

As such a technical field, a conventional one is disclosed in JP 2020-112189 A, for example. The high-pressure tank disclosed in JP 2020-112189 A includes: a liner including a storage space for storing a gas therein and an opening communicating with the storage space; a reinforcing layer formed on the outer peripheral surface of the liner; a mouthpiece including an external thread portion on its outer periphery and mounted on the opening of the liner; and a manifold for closing the opening of the liner. The manifold is formed into a lid shape, and includes an abutting surface that abuts on an end face of the opening of the liner, an inserted portion to be inserted into the opening, and an internal thread portion to be screwed into the external thread portion of the mouthpiece. The manifold is mounted on the mouthpiece by screwing together its internal thread portion and the external thread portion of the mouthpiece, thereby closing the opening of the liner.

SUMMARY

In the above-described high-pressure tank, however, there is a problem that when a gas in the tank leaks out through a gap between the opening and the inserted portion of the manifold, the leaking gas will accumulate on the abutting surface of the manifold, leading to an increase in the load on the manifold. To solve such a problem, a method for increasing a tightening force by screwing is studied, for example, by increasing the length of the internal thread portion of the manifold and the length of the external thread portion of the mouthpiece, that is, the length of the portion that screws them together. However, increasing the length of the screwing portion may lead to another problem that the amount of gas to be stored decreases.

In view of the foregoing, the present disclosure provides a high-pressure tank capable of preventing an increase in the load on the lid-like member even if a gas leaks through a gap between the opening and the inserted portion of the lid-like member.

A high-pressure tank according to the present disclosure is a high-pressure tank for storing a gas. The high-pressure tank for storing a gas includes: a liner having a cylindrical opening; a reinforcing layer covering the liner; a cylindrical member including an external thread portion on an outer periphery thereof and externally fixed to the reinforcing layer covering the opening; a lid-like member including an inserted portion to be inserted into the opening so as to close the opening, an abutting surface configured to abut on an end face of the opening, and an internal thread portion on an inner periphery thereof to be screwed into the external thread portion of the cylindrical member; and a communicating path that allows the abutting surface of the lid-like member to communicate with an outside of the high-pressure tank.

Since the high-pressure tank according to the present disclosure includes a communicating path that allows the abutting surface of the lid-like member to communicate with the outside of the high-pressure tank, even if a gas in the tank leaks out through the gap between the opening and the inserted portion of the lid-like member and flows to the abutting surface of the lid-like member, the leaking gas can be discharged from the abutting surface to the outside of the high-pressure tank via the communicating path. This can suppress accumulation of the leaking gas on the abutting surface of the lid-like member, and thus can prevent an increase in the load on the lid-like member.

According to the present disclosure, it is possible to prevent an increase in the load on the lid-like member even if a gas leaks through a gap between the opening and the inserted portion of the lid-like member.

DETAILED DESCRIPTION

The following describes some embodiments of a high-pressure tank according to the present disclosure, with reference to the drawings. Like reference numerals designate like parts throughout the figures of the present description to omit their redundant explanations. The following describes an example of a high-pressure tank which is mounted on a fuel cell vehicle and filled with a high-pressure hydrogen gas. The gas to be filled into the high-pressure tank is not limited to a hydrogen gas. Examples of the gas may include various types of compressed gases, such as CNG (compressed natural gas), various types of liquefied gases, such as LNG (liquefied natural gas) and LPG (liquefied petroleum gas), and the like.

First Embodiment

Figure 1:
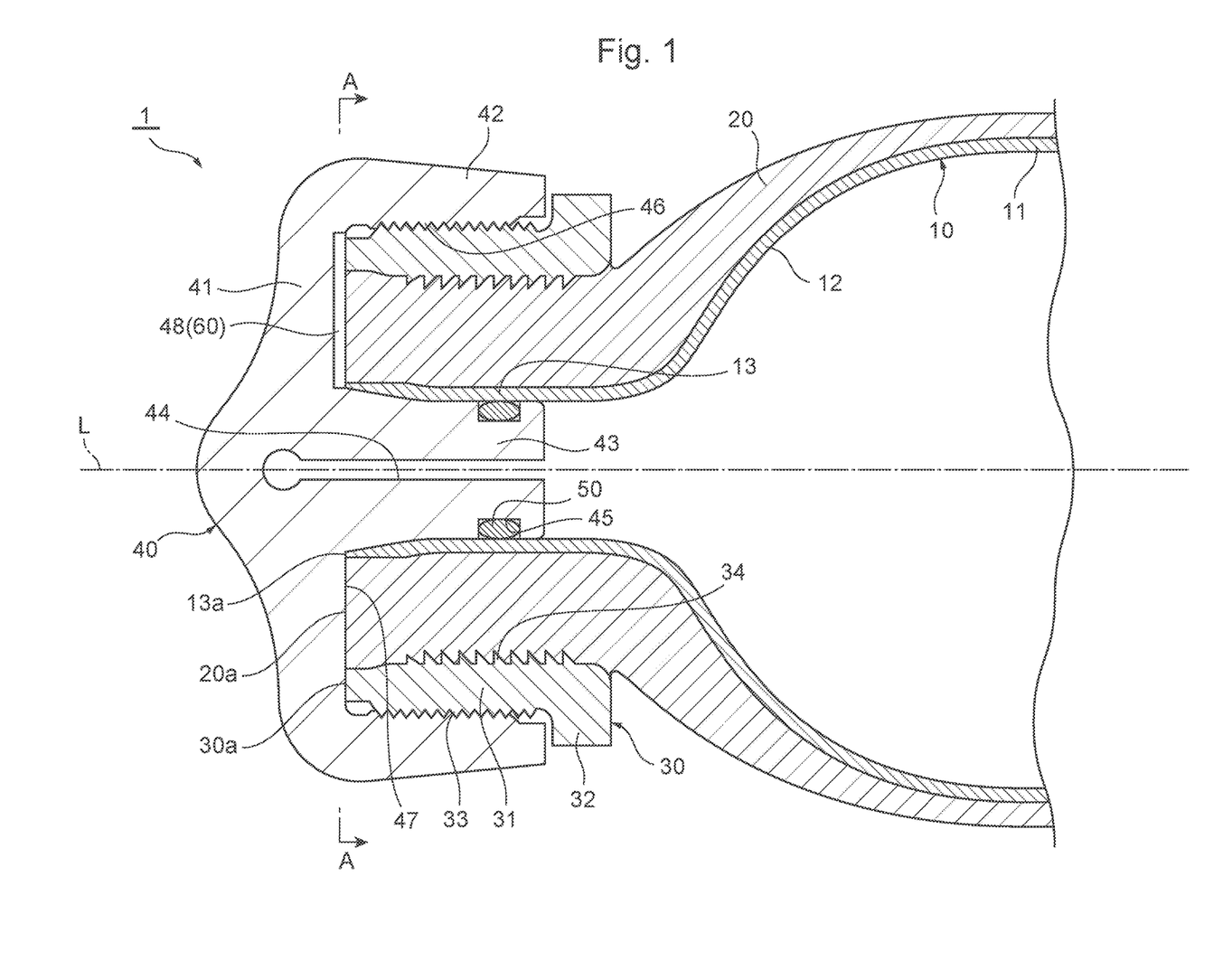
FIG. 1 is a partial cross-sectional view showing a main part of a high-pressure tank according to a first embodiment.

FIG. 1 is a partial cross-sectional view showing a main part of a high-pressure tank according to a first embodiment. A high-pressure tank 1 of the present embodiment is a substantially cylindrically-shaped high-pressure gas storage container having its opposite ends rounded in a dome form.

The high-pressure tank 1 includes a liner 10 having a gas barrier property and a reinforcing layer 20 formed so as to cover the outer peripheral surface of the liner 10.

The liner 10 is made of a resin material having a gas barrier property against the hydrogen gas and includes a cylindrical body 11 and a pair of dome portions 12 (FIG. 1 shows only one of the pair of dome portions 12) provided at the opposite ends of the body 11 in an axis L direction. The axis L direction of the body 11 is equal to the axis L direction of the high-pressure tank 1. In the following description, the "axis L direction of the high-pressure tank 1" is abbreviated as "axis L direction."

The dome portion 12 has a hemispherical shape. The dome portion 12 has a cylindrical opening 13 at its end opposite to the body 11. The opening 13 has an outer diameter smaller than that of the dome portion 12 and is disposed to protrude from the dome portion 12 in the axis L direction. The opening 13 functions as a filling port for filling a hydrogen gas into the high-pressure tank 1 or a discharge port for discharging the hydrogen gas stored in the high-pressure tank 1.

The liner 10 is integrally formed of a resin material, such as polyethylene and nylon, by using a rotation blow molding method, for example. The liner 10 may be made of a light metal, such as aluminum, instead of the resin material. Furthermore, the liner 10 may be formed by joining a plurality of divided members using injection/extrusion molding and the like, instead of the manufacturing method by integral molding, such as the rotation blow molding method.

The reinforcing layer 20 is made of a fiber-reinforced resin. In the present embodiment, carbon fiber reinforced plastics (CFRP) are used as the fiber-reinforced resin. The carbon fiber reinforced plastics cover the whole liner 10 including the opening 13 so as to form the reinforcing layer 20. The reinforcing layer 20 is configured to have a thickness that increases from around the body 11 of the liner 10 toward the dome portion 12 of the liner 10. In the reinforcing layer 20, the part covering the opening 13 has a substantially uniform thickness.

A mouthpiece 30 is externally fixed to the reinforcing layer 20 covering the opening 13. The mouthpiece 30 corresponds to a "cylindrical member" recited in the claims, and is a component produced into a cylindrical shape from a metal material, such as stainless steel or aluminum. The mouthpiece 30 includes a cylindrical mouthpiece body portion 31 extending in the axis L direction and a flange portion 32 being continuous with one end of the mouthpiece body portion 31 and protruding in a radial direction.

In addition, the mouthpiece body portion 31 includes on its outer periphery an external thread portion 33 to be screwed into a manifold 40, which will be described later. The mouthpiece body portion 31 includes on its inner periphery a saw-like locking claw portion 34. The mouthpiece 30 is fixed to the reinforcing layer 20, with its locking claw portion 34 fitting into the outer peripheral portion of the reinforcing layer 20.

The flange portion 32 has a function of increasing the strength of the mouthpiece 30 and a function of limiting the screwing depth of the manifold 40 when the mouthpiece 30 is screwed into the manifold 40. The flange portion 32 is integrally formed with the mouthpiece body portion 31.

As shown in FIG. 1, the manifold 40 is mounted on the opening 13 of the liner 10. The manifold 40 corresponds to a "lid-like member" recited in the claims, and is a member for coupling together a plurality of high-pressure tanks 1. The manifold 40 includes a substantially disk-shaped body portion 41, a side wall portion 42 coupled to the outer peripheral edge of the body portion 41 and extending in the axis L direction, and an inserted portion 43 disposed at the center of the body portion 41 and protruding in a direction equal to the direction of extension of the side wall portion 42.

The inserted portion 43 is a portion to be inserted into the opening 13 so as to close the opening 13, and has a substantially cylindrical shape. The inserted portion 43 has an outer diameter slightly smaller than the inside diameter of the opening 13. The center of the inserted portion 43 is provided with a slit 44 extending in the axis L direction. The slit 44 is a structure that allows the inserted portion 43 to deform when inserted into the opening 13, so that the inserted portion 43 can be easily inserted into the opening 13. In addition, the inserted portion 43 is provided with a circumferential groove 45. The circumferential groove 45 has an O-ring 50 fitted therein for maintaining the space between the inserted portion 43 and the opening 13 hermetically sealed.

The body portion 41 is a portion corresponding to the top of the manifold 40. Since the inner surface of the body portion 41 serves as an abutting surface configured to abut on an end face 13a of the opening 13, the inner surface will be referred to as an abutting surface 47 of the manifold 40. It should be noted that in the present embodiment, the end face 13a of the opening 13, the end face 20a of the reinforcing layer 20, and the end face 30a of the mouthpiece 30, all of which correspond to the abutting surface 47, are flush with each other. In addition, the side wall portion 42 includes on its inner periphery an internal thread portion 46 to be screwed into the external thread portion 33 of the mouthpiece 30.

The high-pressure tank 1 of the present embodiment further includes a communicating path 60 that allows the abutting surface 47 of the manifold 40 to communicate with the outside of the high-pressure tank 1. Hereinafter, the communicating path 60 will be described in detail with reference to FIG. 1 and FIG. 2.

Figure 2:
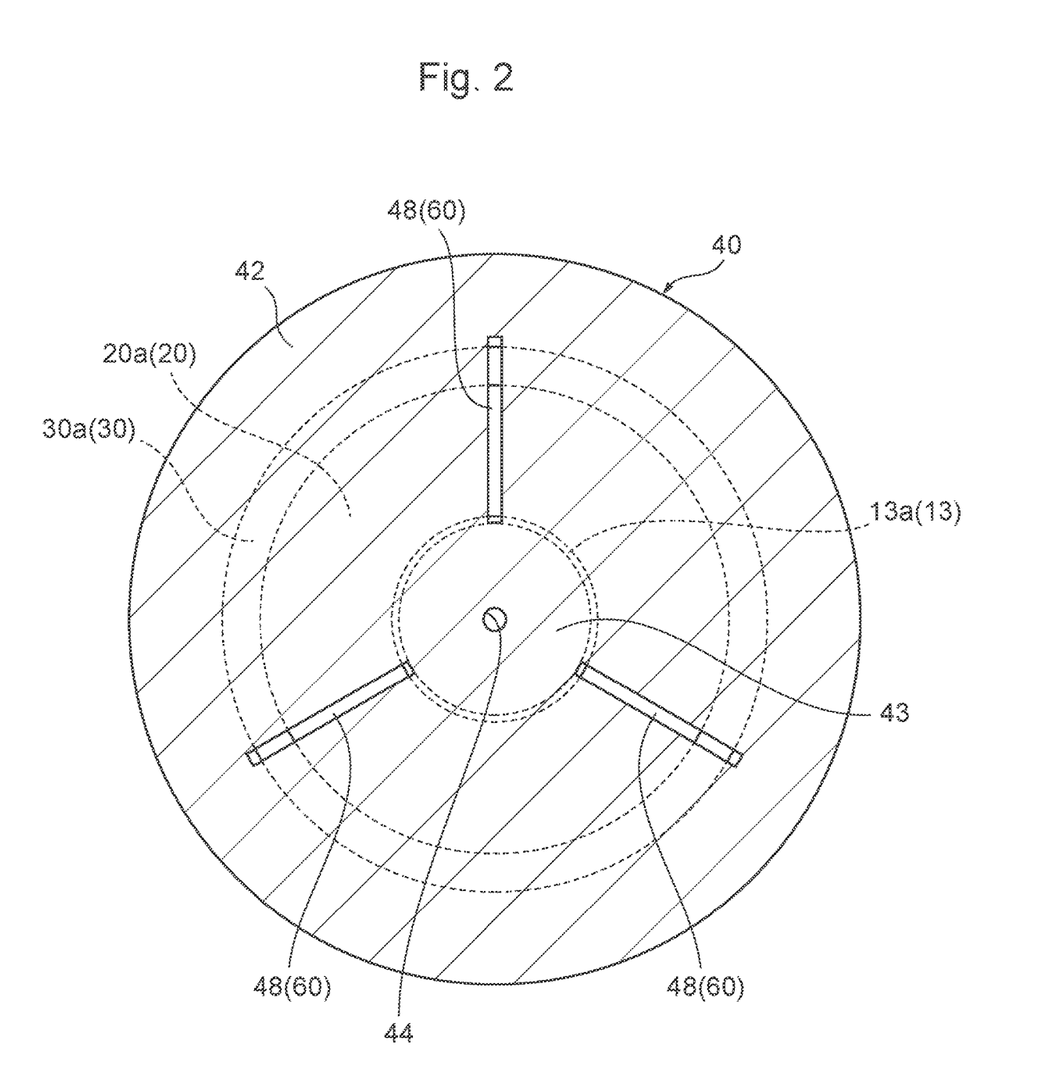
FIG. 2 is a cross-sectional view taken along line A-A of FIG. 1.

FIG. 2 is a cross-sectional view taken along line A-A of FIG. 1. The communicating path 60 includes a recessed groove 48 provided on the abutting surface 47 of the manifold 40. The recessed groove 48 is formed so as to extend from around the center of the manifold 40 toward the internal thread portion 46 in the radial direction of the manifold 40. Three recessed grooves 48 are disposed at regular intervals (e.g., intervals of 120°) in the circumferential direction of the manifold 40, for example. Each of the recessed grooves 48 forms the communicating path 60, together with the portion that screws together the internal thread portion 46 of the manifold 40 and the external thread portion 33 of the mouthpiece 30.

Figure 3:
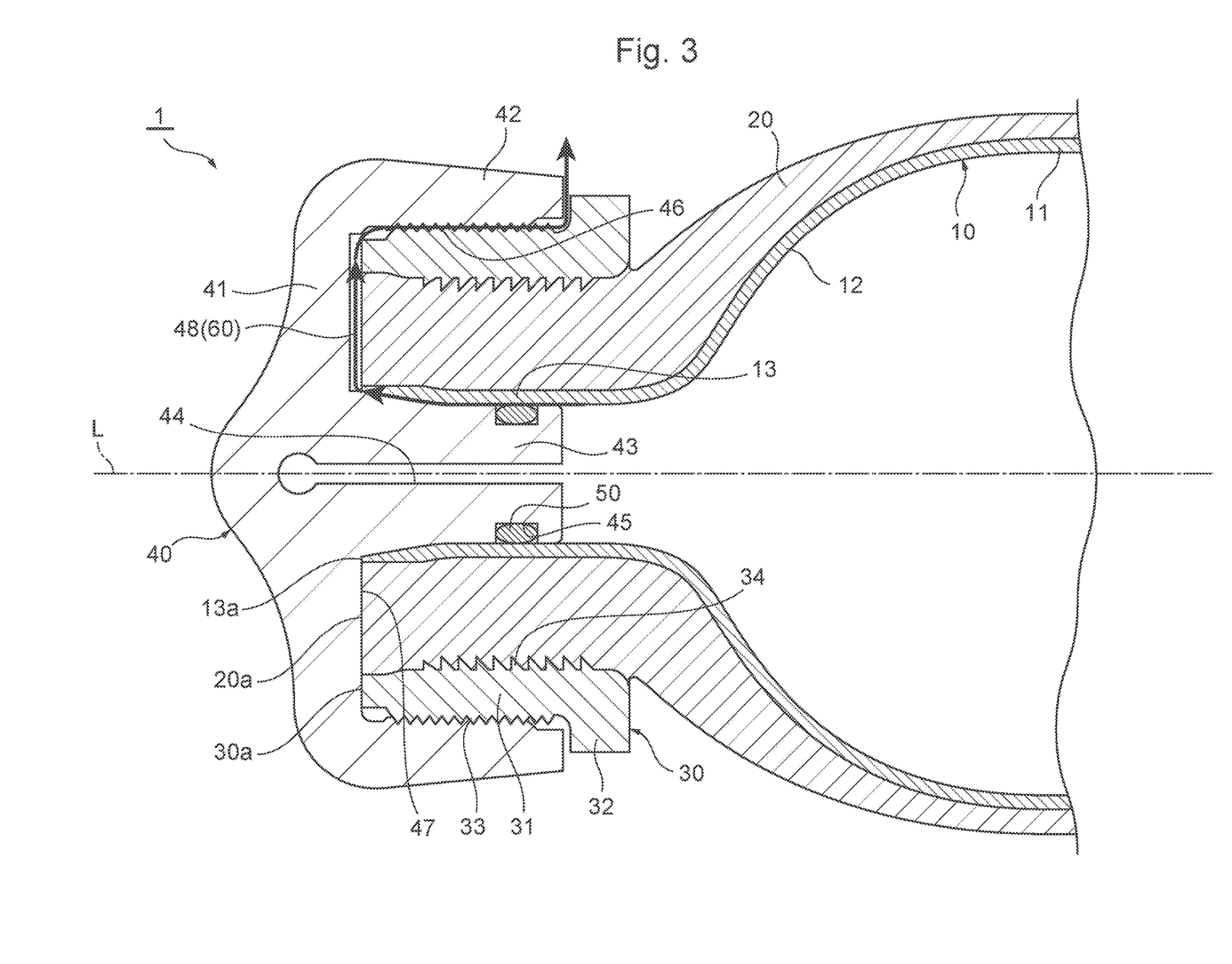
FIG. 3 is a cross-sectional view showing the flow of leaking gas.

In the high-pressure tank 1 with such a configuration, as shown by the arrows of FIG. 3, even if the hydrogen gas in the tank leaks out through the gap between the opening 13 and the inserted portion 43 of the manifold 40 due to a defect of the O-ring 50, for example, and flows to the abutting surface 47 of the manifold 40, the leaking hydrogen gas can be discharged to the outside of the high-pressure tank 1 via the recessed grooves 48 provided on the abutting surface 47 and the portion that screws together the internal thread portion 46 of the manifold 40 and the external thread portion 33 of the mouthpiece 30. That is, the recessed grooves 48 and the portion that screws together the internal thread portion 46 of the manifold 40 and the external thread portion 33 of the mouthpiece 30 serve as a passage for the leaking hydrogen gas. This can prevent the leaking hydrogen gas from accumulating on the abutting surface 47 of the manifold 40, and thus can prevent an increase in the load on the manifold 40.

Second Embodiment

Hereinafter, a second embodiment of the high-pressure tank will be described with reference to FIG. 4 and FIG. 5. A high-pressure tank 1A of the present embodiment differs from the first embodiment in the structure of a communicating path. The other structures of the high-pressure tank 1A are equal to those of the first embodiment. Hereinafter, only the difference will be described.

Figure 4:
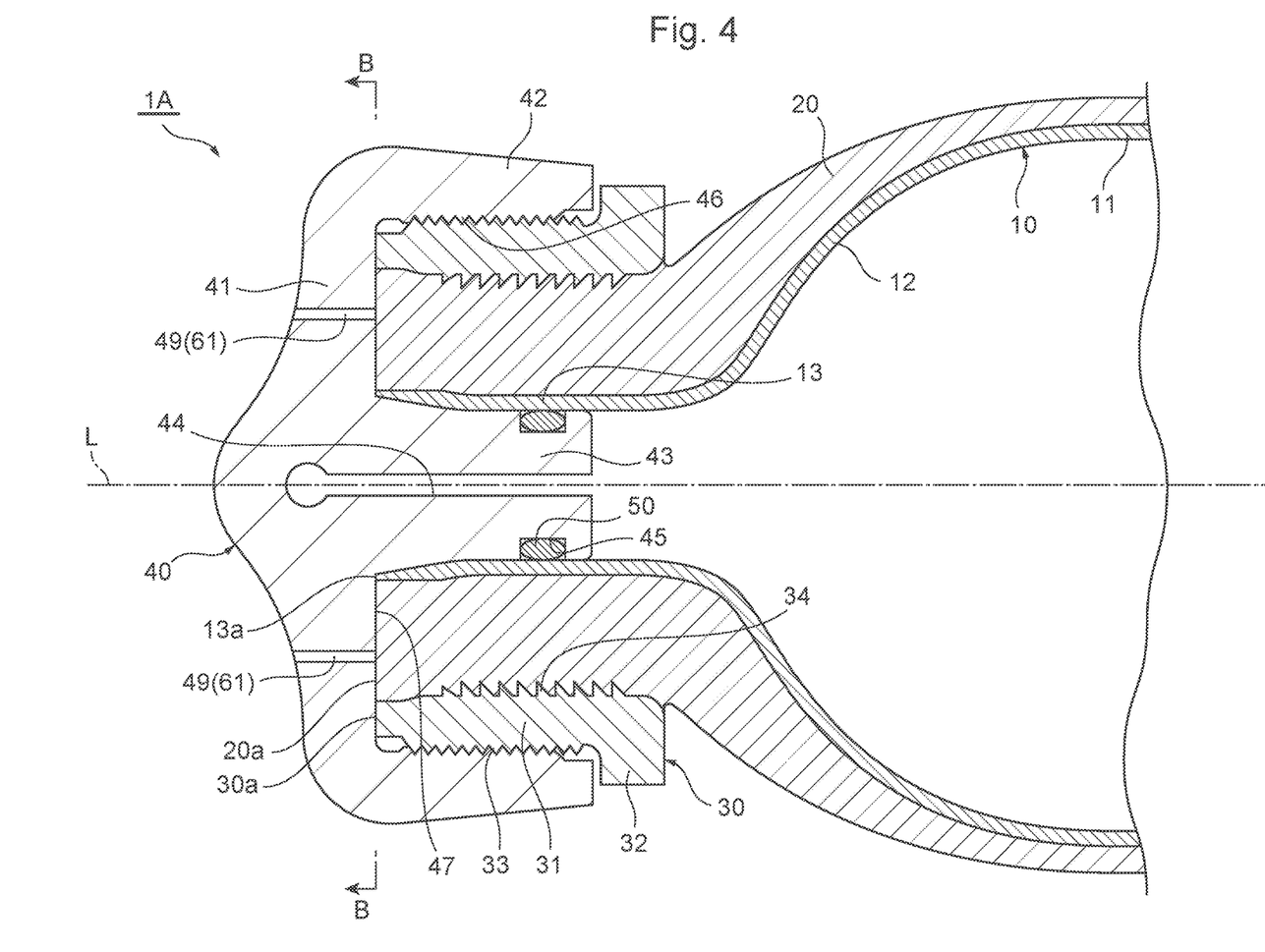
FIG. 4 is a partial cross-sectional view showing a main part of a high-pressure tank according to a second embodiment.
Figure 5:
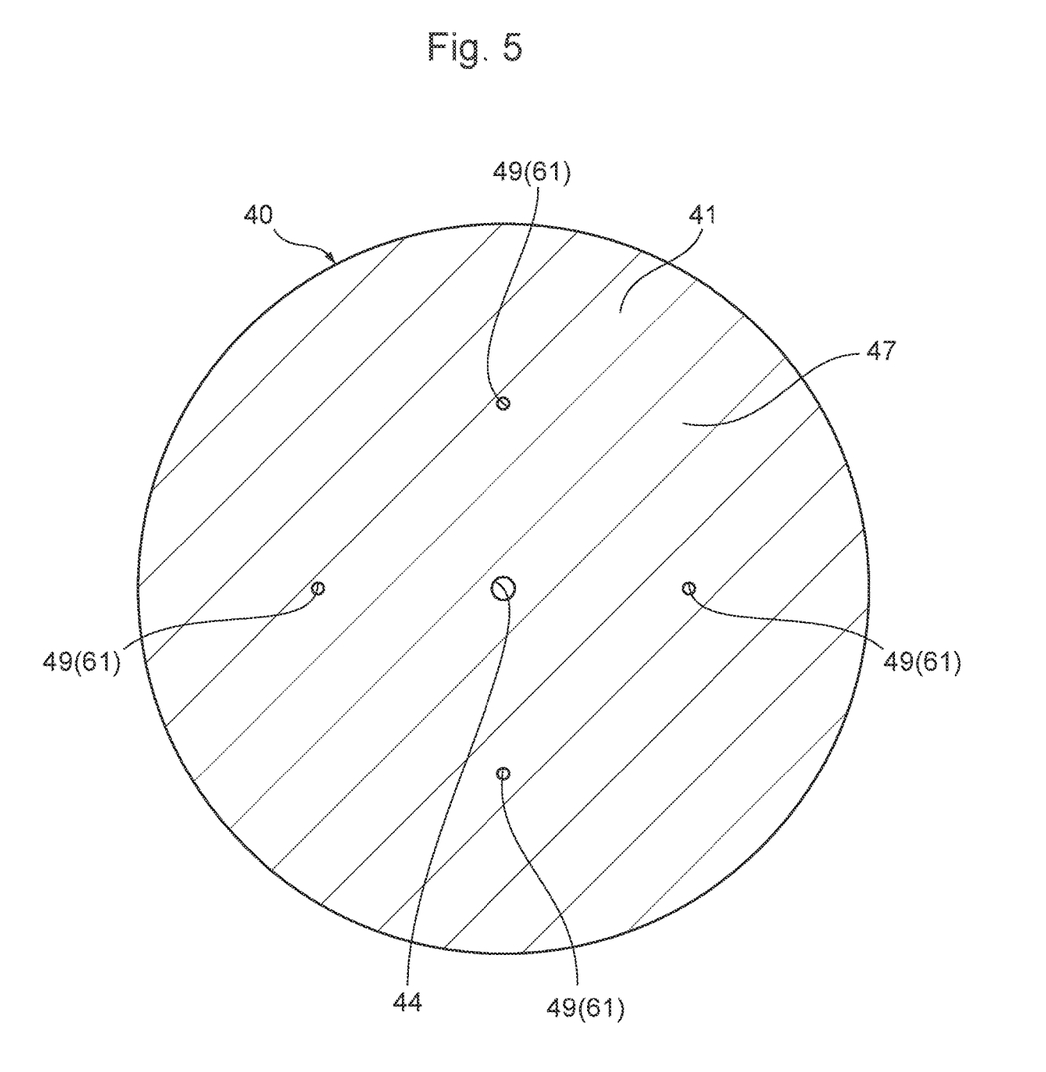
FIG. 5 is a cross-sectional view taken along line B-B of FIG. 4.

FIG. 4 is a partial cross-sectional view showing a main part of the high-pressure tank according to the second embodiment. FIG. 5 is a cross-sectional view taken along line B-B of FIG. 4. In the high-pressure tank 1A of the present embodiment, a communicating path 61 is formed of a through-hole 49 that penetrates the manifold 40 in the axis L direction from the abutting surface 47 of the manifold 40. That is, the through-hole 49 penetrates the body portion 41 of the manifold 40 from the abutting surface 47. One such through-hole 49 or a plurality of through-holes 49 may be provided. As shown in FIG. 5, in the present embodiment, four through-holes 49 are disposed at regular intervals (e.g., intervals of 90°) in the circumferential direction of the manifold 40.

In the high-pressure tank 1A with such a configuration, even if the hydrogen gas in the tank leaks out through the gap between the opening 13 and the inserted portion 43 of the manifold 40 due to a defect of the O-ring 50, for example, and flows to the abutting surface 47 of the manifold 40, the leaking hydrogen gas can be discharged to the outside of the high-pressure tank 1A via the through-holes 49. This can prevent the leaking hydrogen gas from accumulating on the abutting surface 47 of the manifold 40, and thus can prevent an increase in the load on the manifold 40.

Third Embodiment

Hereinafter, a third embodiment of the high-pressure tank will be described with reference to FIG. 6 and FIG. 7. A high-pressure tank 1B of the present embodiment differs from the first embodiment in the structure of a communicating path. The other structures of the high-pressure tank 1B are equal to those of the first embodiment. Hereinafter, only the difference will be described.

Figure 6:
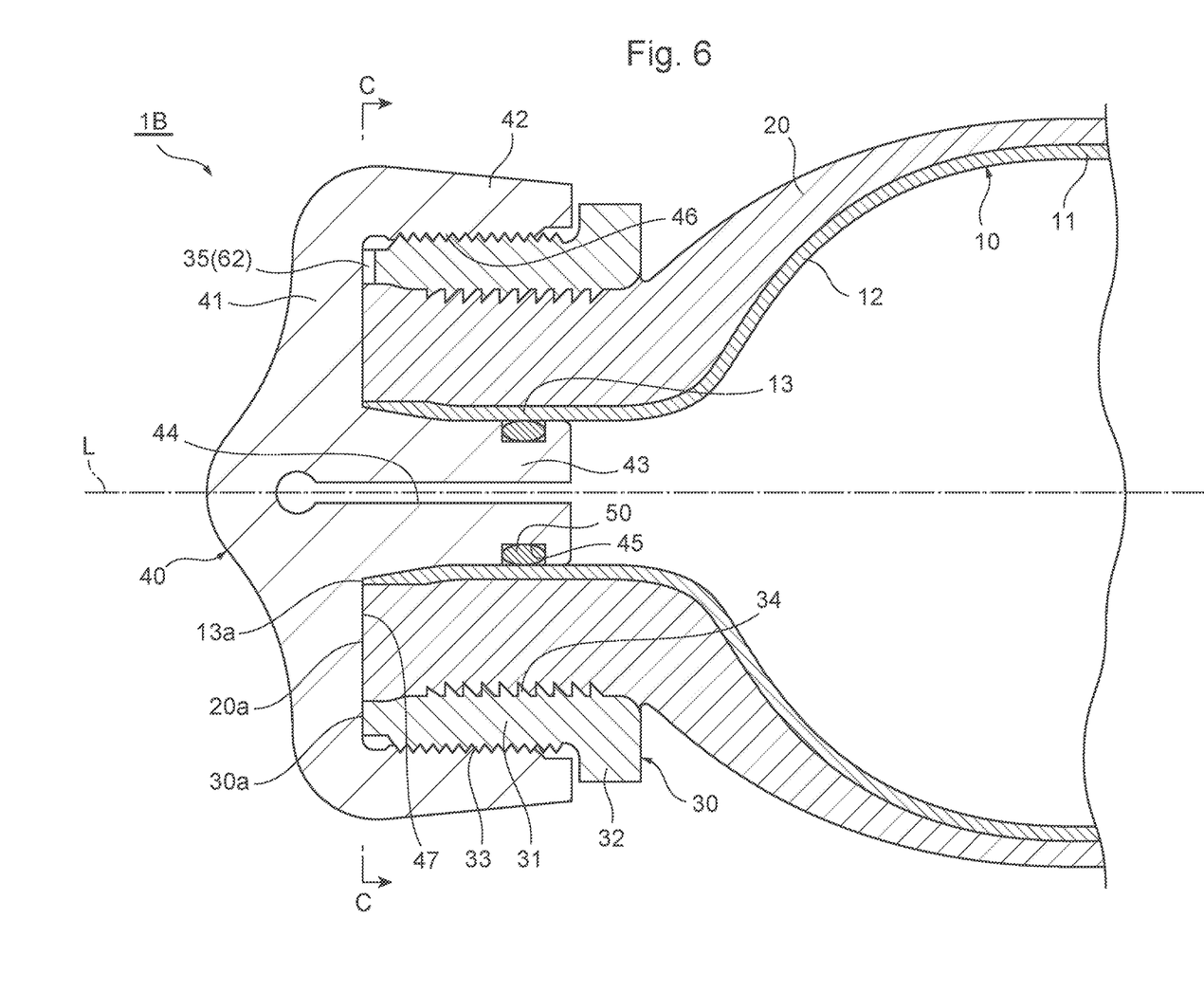
FIG. 6 is a partial cross-sectional view showing a main part of a high-pressure tank according to a third embodiment.

FIG. 6 is a partial cross-sectional view showing a main part of the high-pressure tank according to the third embodiment. FIG. 7 is a cross-sectional view taken along line C-C of FIG. 6. In the high-pressure tank 1B of the present embodiment, the communicating path 62 includes a recessed groove 35 provided on the end face 30a of the mouthpiece 30 that faces the abutting surface 47 of the manifold 40.

Figure 7:
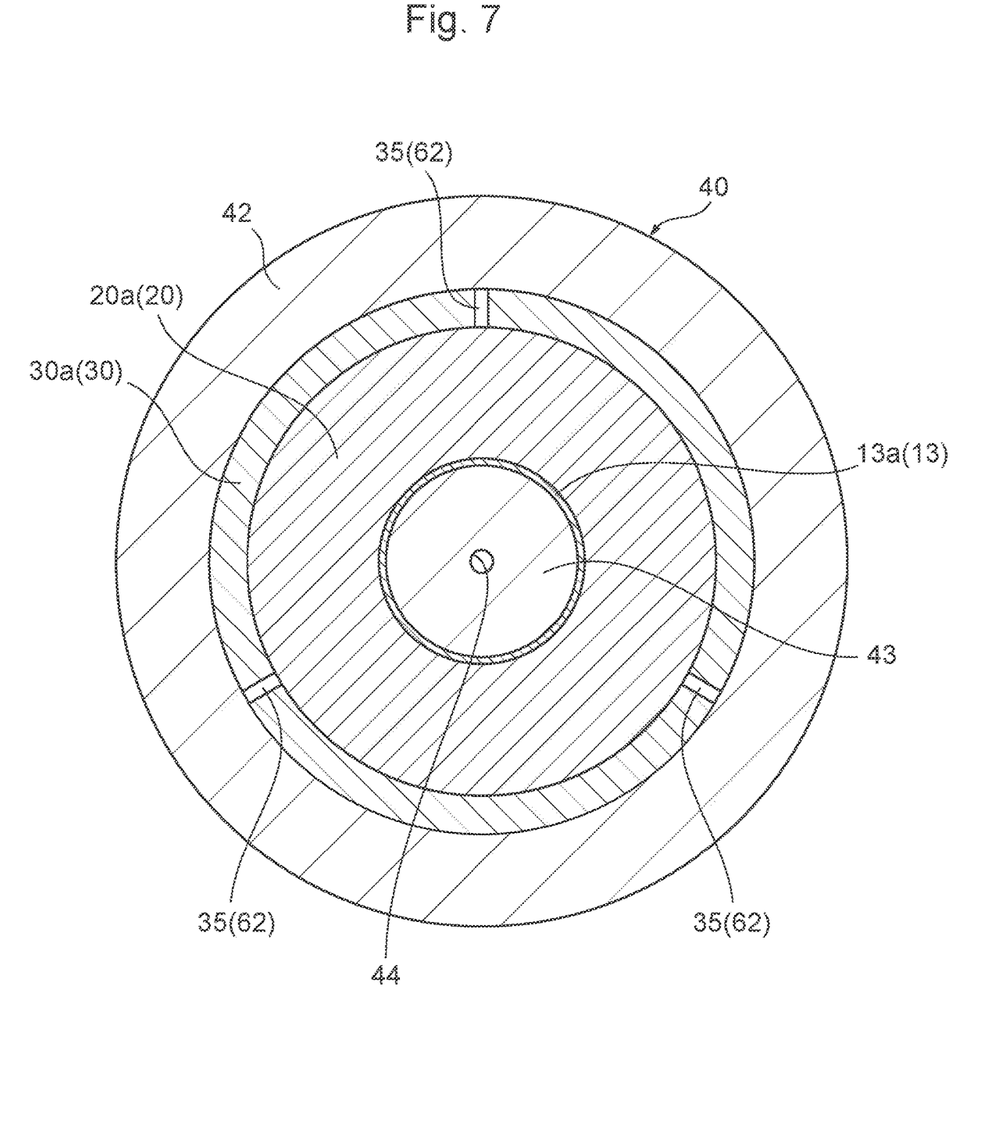
FIG. 7 is a cross-sectional view taken along line C-C of FIG. 6.

As shown in FIG. 6 and FIG. 7, the recessed groove 35 is formed so as to extend from around the reinforcing layer 20 toward the external thread portion 33 of the mouthpiece 30 in the radial direction of the mouthpiece 30. Three recessed grooves 35 are disposed at regular intervals (e.g., intervals of 120°) in the circumferential direction of the mouthpiece 30, for example. Each of the recessed grooves 35 forms the communicating path 62, together with the portion that screws together the internal thread portion 46 of the manifold 40 and the external thread portion 33 of the mouthpiece 30.

In the high-pressure tank 1B with such a configuration, even if the hydrogen gas in the tank leaks out through the gap between the opening 13 and the inserted portion 43 of the manifold 40 due to a defect of the O-ring 50, for example, and flows to the abutting surface 47 of the manifold 40, the leaking hydrogen gas can be discharged to the outside of the high-pressure tank 1B via the recessed grooves 35 provided on the end face 30a of the mouthpiece 30 and the portion that screws together the internal thread portion 46 of the manifold 40 and the external thread portion 33 of the mouthpiece 30. This can prevent the leaking hydrogen gas from accumulating on the abutting surface 47 of the manifold 40, and thus can prevent an increase in the load on the manifold 40.

It should be noted that in this case, the end face 20a of the reinforcing layer 20 that faces the abutting surface 47 of the manifold 40 may also have a recessed groove that couples to the recessed groove 35 provided on the end face 30a of the mouthpiece 30. Such a configuration can discharge the hydrogen gas having flown to the abutting surface 47 more smoothly to the outside of the high-pressure tank 1B.

Fourth Embodiment

Hereinafter, a fourth embodiment of the high-pressure tank will be described with reference to FIG. 8. A high-pressure tank 1C of the present embodiment differs from the first embodiment in the structure of a communicating path. The other structures of the high-pressure tank 1C are equal to those of the first embodiment. Hereinafter, only the difference will be described.

Figure 8:
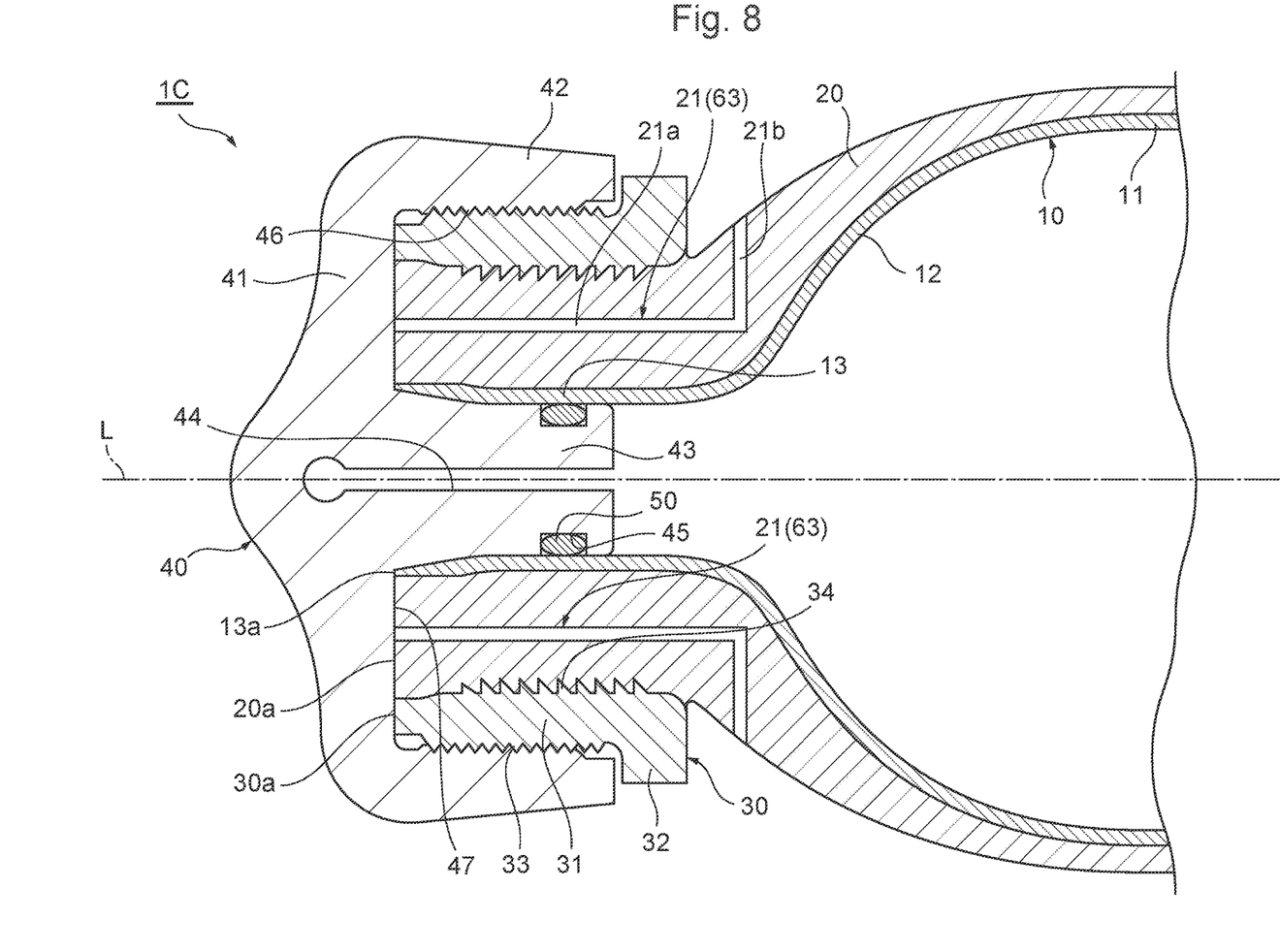
FIG. 8 is a partial cross-sectional view showing a main part of a high-pressure tank according to a fourth embodiment.

FIG. 8 is a partial cross-sectional view showing a main part of the high-pressure tank according to the fourth embodiment. In the high-pressure tank 1C of the present embodiment, a communicating path 63 is a hole portion 21 provided in the inner part of the reinforcing layer 20 and communicating with the abutting surface 47 of the manifold 40 at one end and communicating with the outside of the high-pressure tank 1C at the other end. Specifically, as shown in FIG. 8, the hole portion 21 has an L shape, for example, and includes a first portion 21a extending in the axis L direction and a second portion 21b communicating with the first portion 21a and extending in a radial direction crossing the axis L direction. One end of the first portion 21a communicates with the abutting surface 47, and the length of the first portion 21a between the one end and the other end is greater than the length of the mouthpiece 30 in the axis L direction. This can prevent the second portion 21b coupled to the other end of the first portion 21a from interfering with the mouthpiece 30.

It should be noted that one such hole portion 21 or a plurality of hole portions 21 may be provided. Four hole portions 21 are disposed at regular intervals (e.g., intervals of 90°) in the circumferential direction of the reinforcing layer 20, for example. It should be noted that the cross-sectional shape of the hole portion 21 is not particularly limited, and may be a circular shape, a rectangular shape, or the like.

In the high-pressure tank 1C with such a configuration, even if the hydrogen gas in the tank leaks out through the gap between the opening 13 and the inserted portion 43 of the manifold 40 due to a defect of the O-ring 50, for example, and flows to the abutting surface 47 of the manifold 40, the leaking hydrogen gas can be discharged to the outside of the high-pressure tank 1C via the hole portions 21. This can prevent the leaking hydrogen gas from accumulating on the abutting surface 47 of the manifold 40, and thus can prevent an increase in the load on the manifold 40.

It should be noted that in this example, the hole portion 21 may further have a pipe embedded therein, which is made of a resin material. That is, the communicating path is formed of a pipe provided in the inner part of the reinforcing layer 20 and communicating with the abutting surface 47 at one end and communicating with the outside of the high-pressure tank 1C at the other end. In this case, the same operational effect can be obtained.

In the above-described embodiments, the example of the manifold 40 has been described as the lid-like member. However, the lid-like member may be a cap, a valve member, and the like. In such cases as well, the same operational effect as that of the case of using the manifold 40 can be obtained.

Although the embodiments of the present disclosure have been described in detail above, the present disclosure is not limited thereto, and various design changes can be made within the spirit and scope of the present disclosure recited in the claims.

What is claimed is:

1. A high-pressure tank for storing a gas, comprising:
 a liner having a cylindrical opening;
 a reinforcing layer covering the liner;
 a cylindrical member including an external thread portion on an outer periphery thereof and externally fixed to a portion of the reinforcing layer covering the liner adjacent to the cylindrical opening;
 a lid-like member including an inserted portion to be inserted into the opening so as to close the opening, an abutting surface configured to abut on an end face of the opening, and an internal thread portion on an inner periphery of the lid-like member to be screwed into the external thread portion of the cylindrical member; and
 a communicating path that allows a space formed adjacent to the abutting surface of the lid-like member to communicate with an outside of the high-pressure tank,
 wherein the communicating path includes a recessed groove provided on the abutting surface of the lid-like member or an end face of the cylindrical member that faces the abutting surface, and the recessed groove extends in a direction orthogonal to an axial direction of the high-pressure tank;
 wherein the recessed groove is provided on the end face of the cylindrical member that faces the abutting surface and extends from the reinforcing layer toward the external thread portion.

* * * * *